United States Patent
Burt

[15] 3,640,327
[45] Feb. 8, 1972

[54] FASTENER WITH FLOATING NUT

[72] Inventor: John Burt, Burbank, Calif.
[73] Assignee: Deutsch Fastener Corp., Los Angeles, Calif.
[22] Filed: May 8, 1970
[21] Appl. No.: 35,853

[52] U.S. Cl..............................151/41.74, 151/41.76, 85/9, 85/45
[51] Int. Cl.......................................F16b 43/00
[58] Field of Search ..............151/41.7, 41.72, 41.73, 41.74, 151/41.75, 41.76; 85/32 K, 45, 1 P, 9

[56] References Cited

UNITED STATES PATENTS

| | | | |
|---|---|---|---|
| 1,570,148 | 1/1926 | Herr | 151/41.74 |
| 1,749,547 | 3/1930 | Ruddy | 85/45 |
| 2,243,923 | 6/1941 | Swanstrom | 151/41.76 |
| 2,338,023 | 12/1943 | Bugg | 85/45 |
| Re22,543 | 9/1944 | Tinnerman | 151/41.75 |
| 2,815,789 | 12/1957 | Hutson et al. | 151/41.7 |
| 2,986,188 | 5/1961 | Karp et al. | 151/41.73 |
| 3,131,743 | 5/1964 | Hinkle et al. | 151/41.73 |
| 3,405,752 | 10/1968 | Neuschotz | 151/41.72 |

FOREIGN PATENTS OR APPLICATIONS

| | | | |
|---|---|---|---|
| 137,741 | 6/1950 | Australia | 151/41.7 |
| 483,089 | 4/1938 | Great Britain | 85/32 K |

Primary Examiner—Marion Parsons, Jr.
Attorney—Gausewitz, Carr & Rothenberg

[57] ABSTRACT

A fastener including a sleeve having a first flange at one end which extends radially outwardly and terminates in a portion extending longitudinally toward the opposite end of the sleeve for a limited distance, the opposite end of the sleeve being of reduced wall thickness and being adapted to be bent outwardly to form a second flange cooperating with the first flange in holding the sleeve to the workpiece when the sleeve has been inserted through an opening in the workpiece, a nut being received within the sleeve with clearance around its periphery, the nut having outwardly projecting tabs extending through slots in the sleeve into the space provided by the first flange, so that the nut is permitted limited lateral floating movement and precluded from substantial rotation, the bolt having a threaded shank with a pointed end for facilitating entry into the nut, and having a wide thin head provided with a central protrusion engaged by a tubular portion of the driving tool for aligning the driving tool with the head. The tubular portion of the driving tool is spring biased outwardly and is moved inwardly upon engagement with the head at the central portion thereof, while blades on the driving blade tool enter the slot in the bolt head.

12 Claims, 7 Drawing Figures

PATENTED FEB 8 1972

INVENTOR.
JOHN BURT

BY
*Jurmwitz & Carr*

ATTORNEYS.

INVENTOR.
JOHN BURT
BY
ATTORNEYS.

FASTENER WITH FLOATING NUT

BACKGROUND OF THE INVENTION

1. Field of the Invention

This invention relates to fasteners.

2. The Prior Art

Helicopters and VTOL craft are capable of operating from landing mats which may be placed over terrain where there has been no time-consuming construction of a conventional landing pad or airstrip. In one system, the landing mat is made up of an assembly of flat panels arranged in an overlapping pattern and secured together. These may be panels of glass fiber-reinforced plastic arranged in an overlapping relationship. This has the advantage of permitting assembly of a number of panels into a landing mat of desired size, while the individual panels are readily transportable for use wherever needed. The landing mats may be installed or removed as the occasion demands simply by assembling or disassembling the panels.

In order for the landing mat to be used to maximum advantage, there must be provided a means to rapidly yet securely attach the panels together. Conventional bolts obviously are not suitable because they require access to both sides of the panel. Screws likewise are not satisfactory because the panels of the landing mat cannot provide threads of adequate strength. A suitable fastener, therefore, preferably will have some means for attaching a nut to the bottom panel, where it is held against rotation and prevented from separating when the panels are disassembled. Moreover, the nut should be permitted a large amount of lateral floating movement so that it can be engaged by the bolt even when the panels are misaligned. The fasteners should provide only slight protrusions at either end of attached panels, and not be vulnerable during handling or under compression loads.

There have been provided in the past fasteners in which a nut is secured to a workpiece and allowed limited floating movement while being precluded from substantial rotation. In these designs, generally the nut has projected from one side of the workpiece where it occupies additional volume and may be subject to damage during handling of the workpiece. Fasteners of this type are shown in U.S. Pat Nos. 2,420,733, 2,717,622, 2,815,789 and 2,972,367. Many of these fasteners are somewhat complex and expensive. Moreover, usually some cumbersome means, such as auxiliary rivets, are used to secure the nut assembly to the workpiece. In U.S. Pat. No. 3,389,736, a type of nut is held to a panel by a flanged sleeve, but this is for an axially movable nut that does not float laterally, rather than for an axially fixed nut with provision for lateral floating as needed for securing landing mat panels. Where flanges overlap tab elements on the nuts to allow floating, as in U.S. Pat. Nos. 2,717,622 and 2,815,789, the flanges are not capable of supporting substantial exterior loads without bending inwardly so as to interfere with the floating movement of the nut. The nut in U.S. Pat. No. 1,356,835 is buried within an opening in a workpiece, but the retaining cup has projecting spikes that must be driven into the workpiece to be held by friction. Consequently, there is no positive retention of the nut.

SUMMARY OF THE INVENTION

The fastener arrangement of this invention includes a sleeve, within which is a nut having tabs which project outwardly through slots in the circumferential wall of the sleeve. The lateral dimension of the nut is substantially less than the internal diameter of the sleeve, and the tabs are narrower than the slots, so that substantial lateral floating movement is permitted, while the tabs prevent the nut from more than limited rotational movement.

The sleeve includes a flange projecting outwardly in the radial direction at one end, terminating in a radial outer portion that projects backwardly toward the opposite end of the sleeve for a limited distance. This provides an annular recess into which the ends of the tabs of the nut extend. The flange is of relatively thick cross section, so that it will withstand compression loads on the fastener without bending inwardly to interfere with the tabs and prevent the floating movement of the nut.

The sleeve is extended through an opening in a panel to bring the edge of the flange into engagement with one panel surface, while the opposite end of the sleeve projects beyond the other panel surface. The projecting end of the sleeve is of reduced wall thickness and adapted to be bent outwardly to overlap the the other side of the panel to cooperate with the flange and form an attachment. It may be clamped securely against the panel surface so that the sleeve is prevented from rotation. In this manner, the nut is mounted within the opening in the panel with very little protrusion of the assembly beyond the panel surfaces.

The bolt is extended through a clearance opening in the other panel and includes a conical end on its threaded shank to facilitate entry of the shank into the threaded opening in the nut. The bolt has a wide thin head that overlaps the outer surface of the panel with which it is associated. A cross slot extends through the head for engagement by the driving tool. At the central portion of the head is a short outward protrusion which is used in aligning the driving tool on the fastener head.

The driving tool includes a member terminating in a radial face, from which extend two blade portions for entry into the driving slot in the fastener head. Between the blade portions is a tubular element, which is spring biased outwardly. This member is dimensioned to receive the protrusion on the head of the fastener, thereby indexing the driving tool in the fastener head and assuring that the blades will engage the driving slot properly during the rotation of the bolt.

DESCRIPTION OF THE PREFERRED EMBODIMENT

Figure 1:
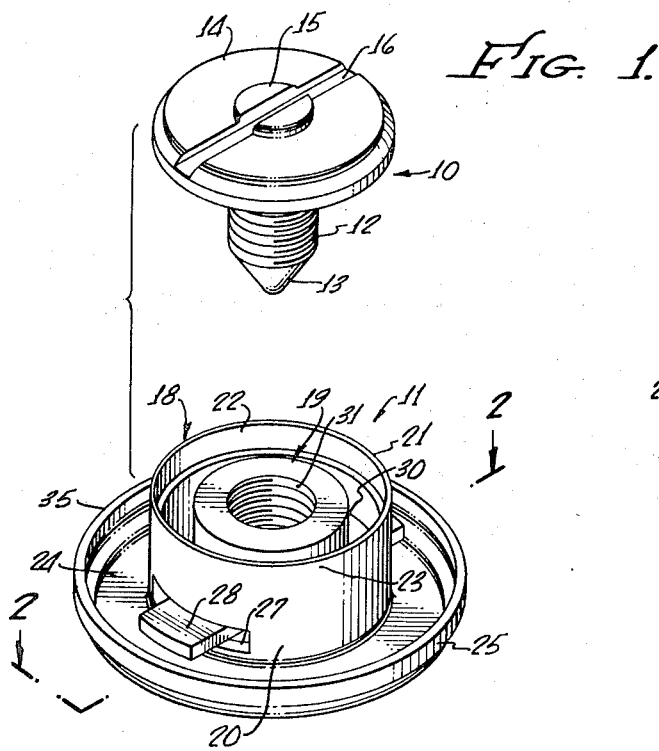
FIG. 1 is a perspective view of the fastener in the separated position.
Figure 2:
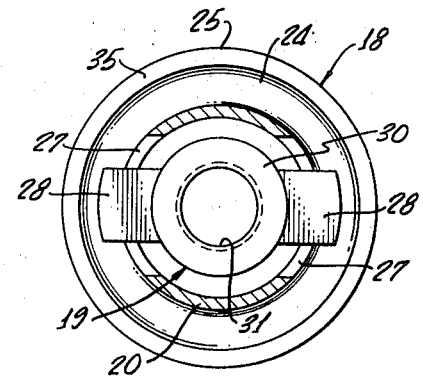
FIG. 2 is a sectional view taken along line 2—2 of FIG. 1.

The fastener of this invention includes a bolt 10 and a nut assembly 11. The bolt 10 includes a shank 12, the end portion of which is threaded and terminates in a generally conical end surface 13. At the opposite end of the shank 12 is a wide, relatively flat head 14. The head 14 has a greater diameter than that of an ordinary screw or bolt and, at the same time, is considerably thinner than a conventional screw or bolthead. At the center of the head 14 is a circular protrusion 15 that extends a short distance from the head 14 in a direction opposite from that of the shank 12. A cross slot 16 extends diametrically through the outer surface of the head 14 and the protrusion 15.

The nut assembly 11 includes a collar 18, within which is a nut 19. The collar 18 includes a central tubular portion 20 which is circular in cross section. Adjacent its outer end 21, the tubular portion is provided with a counterbore 22 that extends inwardly a short distance and provides an end portion 23 having a relatively thin wall.

At the opposite end of the tubular portion 20 is an integral outwardly projecting annular flange 24. The flange 24 extends radially from the end of the tubular section 20, terminating in a short cylindrical part 25 that is coaxial with the tubular portion 20. The cylindrical part 25 of the flange 24 extends toward the end 21 of the collar 18, but is considerably shorter than the tubular portion 20 of the collar.

Radially opposite the cylindrical portion 25 of the flange 24, the tubular portion of the collar 18 is provided with two relatively wide diametrically opposed circumferential slots 27 through its wall. These slots receive a pair of diametrically oppositely projecting tabs 28 on one end of the nut 19. The tabs 28 have considerably less width than the slots 27. The overall distance between the outer ends of the tabs 28 is substantially less than the internal diameter of the cylindrical portion 25 of the flange 24.

The central portion 30 of the nut 19 has a cylindrical exterior surface with a diameter somewhat less than the interior diameter of the tubular portion 20 of the collar 18. A threaded bore 31 extends through the nut 19. With the tabs 28 being at one end of the nut and received in slots at one end of the tubular portion 20 of the collar 18, the nut is held entirely within the collar between its opposite ends.

With the portion 30 of the nut being of lesser diameter than the interior of the tubular portion 20 of the collar, and the tabs 28 narrower than the slots 27, the nut 19 is permitted a large amount of floating movement relative to the collar 18. It may move laterally in any direction to bring the periphery of the cylindrical portion 30 of the nut into adjacency with the inner wall of the tubular portion 20 of the collar. At the same time, the tabs 28 will engage the edges of the slots 27 to limit rotational movement of the nut 19 relative to the collar 18.

Figure 4:
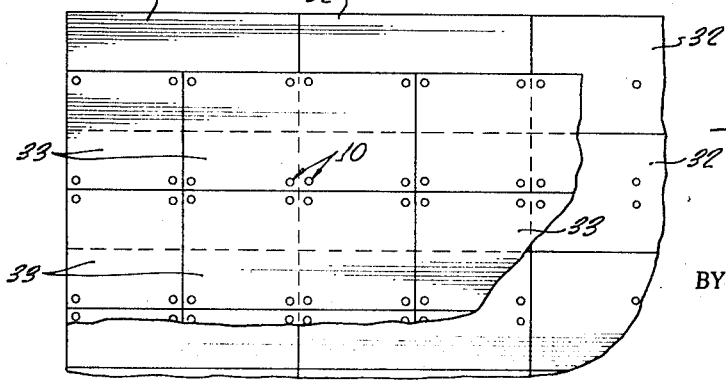
FIG. 4 is a fragmentary plan view illustrating the arrangement of landing mat panels to be secured by the fastener of this invention.

In use of the fastener, the nut assembly 11 is associated with one workpiece 32, while the bolt 10 is extended through the other workpiece 33. Typically, the workpieces 32 and 33 are panels of a landing mat assembly. These may be made of glass fiber reinforced plastic around three-eighths inch thick and 3 feet by 6 feet in plan. These panels may be arranged in an edge-to-edge abutting relationship in two layers, as shown in FIG. 4. Thus, on the bottom are the panels 32 with their adjacent edges in contact. The upper panels 33 are superimposed on the lower panels 32 and in a staggered relationship with the lower panels. In completing a landing mat, it is necessary to secure the panels 32 and 33 together to provide a unitary structure, which may be accomplished by positioning fasteners at the corners, as indicated in FIG. 4.

Figure 3:
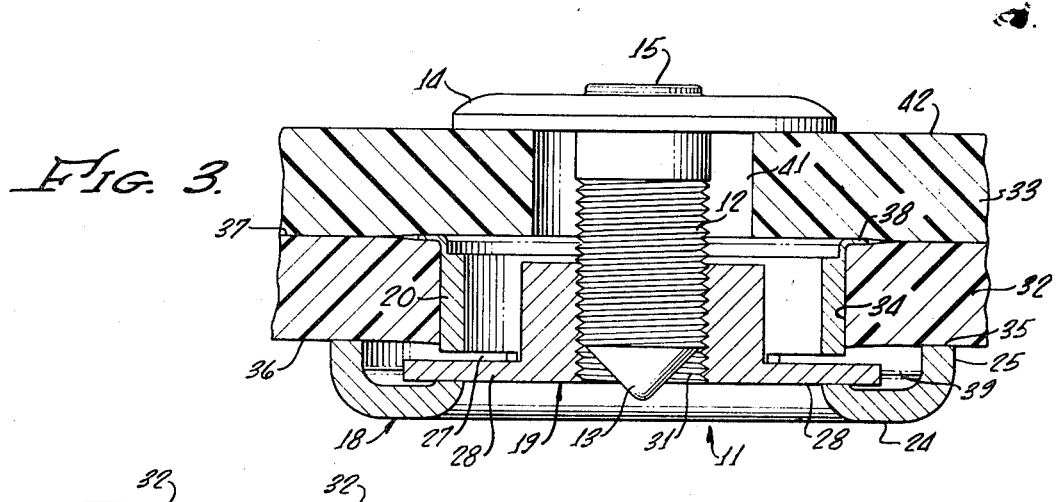
FIG. 3 is an enlarged longitudinal sectional view of the fastener in the secured position holding together two panels.

When the nut assembly 11 is attached to the panel 32, an opening 34 is provided in the panel, through which the tubular portion 20 of the collar 18 is extended. The fastener and panel are proportioned such that, when the radial edge surface of the outer portion 25 of the flange 24 is brought into engagement with one outer surface 36 of the panel 32, the end portion 23 of the collar 18 projects beyond the opposite outer surface 37 of the panel 32. The thin-walled portion 23 of the collar then is bent outwardly to form a flange 38 that overlaps the opposite surface 37 of the panel 32, cooperating with the flange 24 in retaining the nut assembly 11 to the workpiece, as seen in FIG. 3. The flange 38 may be clamped firmly against the surface 37 of the panel 32 so that the nut assembly is frictionally held against rotation relative to the panel. When the nut assembly 11 is so secured to the panel 32, an annular space 39 is provided between the flange 24 and the outer surface 36 of the panel 32. This provides a clearance so that there is no interference with the tabs 28, and the nut 19 is not restrained in its floating movement relative to the collar 18.

An oversize opening 41 is formed in the panel 33 to receive the shank 12 of the bolt 10. With the head 14 being of wide diameter, it will overlap the outer surface 42 of the panel 33, irrespective of the lateral position of the bolt 10 within the opening 41. Therefore, the bolt 10 also is allowed considerable lateral floating movement. This permits the bolt and nut to be mated despite considerable misalignment of the openings through the panels 32 and 33. The tapering conical end 13 of the shank 12 facilitates the entry of the shank into the threaded bore 31 of the nut 19 and permits the threads to become engaged.

When the bolt 10 is advanced into the nut 19 to hold the panels 32 and 33 together, the flat nut 14 provides only a small protrusion above the outer surface 42 of the panel 33. Similarly, the flange 24 extends down below the surface 36 of the lower panel 32 only a short distance. The nut 19 is substantially buried in the opening 34 in the panel 32. The nut assembly is protected both during handling and use of the landing mat panels. The nut 19 will retain its ability to float laterally to facilitate engagement of the fastener because the tabs 28 are protected by the flange 24. The latter element is fully supported around its outer perimeter by the surface 35 and at its inner edge by the tubular section 20 of the collar. Relatively large exterior forces may be imposed without causing the flange 24 to be bent inwardly to engage the tabs 28.

Figure 5:
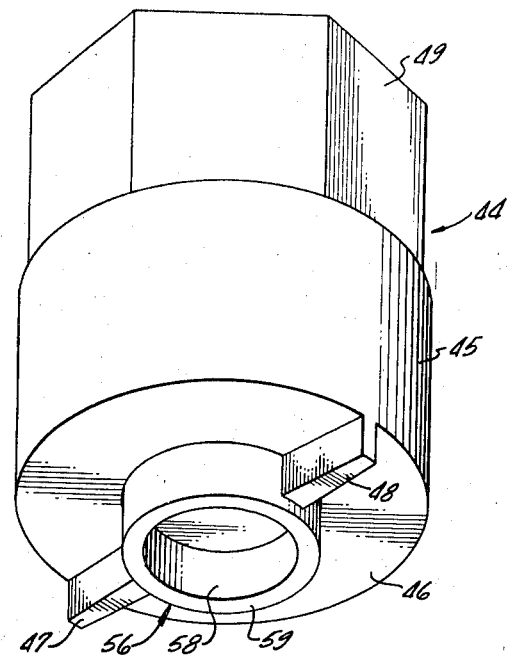
FIG. 5 is a perspective view of the driving tool.
Figure 6:
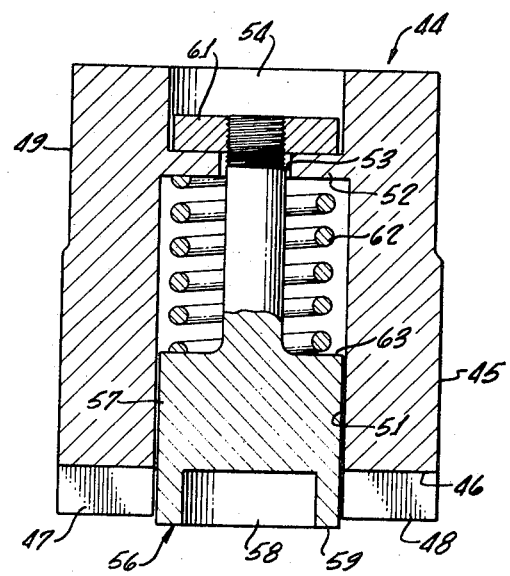
FIG. 6 is a longitudinal sectional view of the driving tool.
Figure 7:
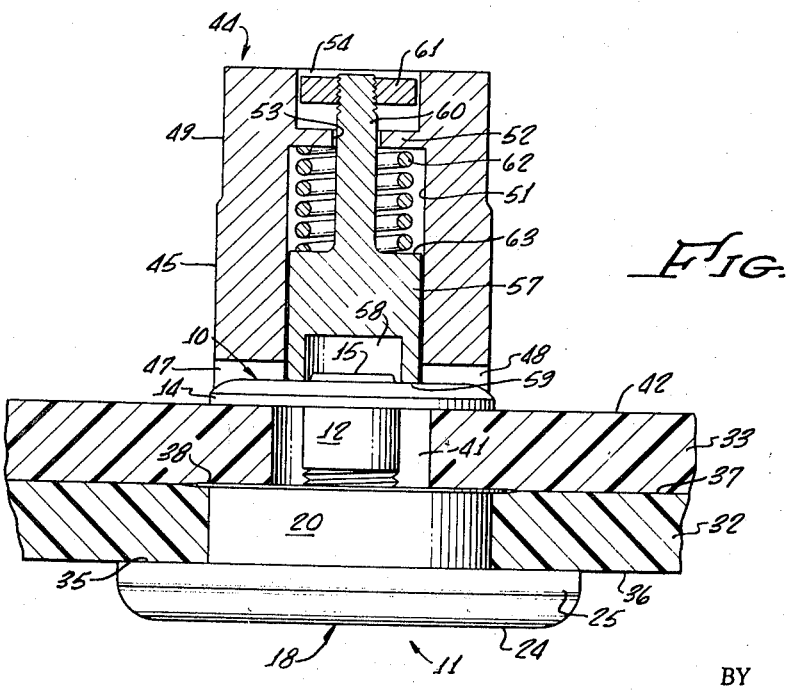
FIG. 7 is a longitudinal sectional view showing the driving tool in association with the bolthead.

In order to facilitate the driving of the bolt 10 with its wide flat head, preferably a special driving tool 44 is utilized (see FIGS. 5, 6 and 7). This tool includes a cylindrical body 45 having a radial end face 46 from which driving blades 47 and 48 project longitudinally. These blades extend radially inwardly from opposite circumferential edges of the driver and provide the wrenching surfaces that are adapted to engage the bolt-wrenching surfaces defined by the slot 16. With the blades 47 and 48 in the slot 16, the body 45 may be rotated in any suitable manner to turn the bolt 10 and drive the fastener. There may be a hexagonal portion 49 on the body 45, as illustrated in FIG. 5, or the tool may be connected in any appropriate manner to a power-operated device for rotating it.

Between the blades 47 and 48, an opening 51 extends axially inwardly from the outer radial face 46 of the driver body 45. A transverse wall 52 is at the inner end of the opening 51, having a central opening 53 of smaller diameter which leads to a larger end opening 54. A plunger 56 is received in the openings 51, 53 and 54. It includes an end portion 57 having a circumferential wall that is substantially complementary to the opening 51, and which is provided with a bore 58 in its outer end 59. The end portion 57 is between the blades 47 and 48, which are positioned radially with respect to the plunger. The interior diameter of the bore 58 is just slightly larger than the diameter of the protrusion 15 on the head 14 of the bolt 10. A stem 60 extends from the portion 57 of the plunger 56, passing through the opening 53 into the opening 54, where it is threaded and engaged by a nut 61. A compression spring 62 bears against the transverse wall 52 and against the suitable 63 between the portion 57 and the stem 60 of the plunger 56. This biases the plunger 56 outwardly with respect to the end 46 of the body 45, bringing the nut 60 into engagement with the wall 52. In this position, the end 59 of the plunger 56 extends outwardly in the axial direction a short distance past the blades 47 and 48.

In use of the driving tool 44, it is brought against the outer end of the head 14 of the bolt 10. The protrusion 15 will enter the opening 58, as shown in FIG. 7, centering the tool 44 with respect to the fastener. Axial pressure against the driver 44 overcomes the force of the spring 62 and pushes the plunger 56 axially inwardly so that the blades 47 and 48 are moved against the bottom of the slot 16. The driver 44 is rotated in the usual manner to turn the bolt 10. During this rotation, the presence of the protrusion 15 of the head in the bore 58 maintains the driver and fastener in proper alignment so that the blades 47 and 48 will not slip out of the slot 16.

The foregoing detailed description is to be clearly understood as given by way of illustration and example only, the spirit and scope of this invention being limited solely by the appended claims.

What is claimed is:

1. A floating nut device comprising
 a member having a tubular portion and an integral flange at one end of said tubular portion,
  said flange having a first portion extending generally radially outwardly from said tubular portion,
  and a second portion extending generally longitudinally toward the opposite end of said tubular portion and terminating in a substantially radial edge adapted to engage a workpiece,
  said first and second portions defining a recess,
 a nut received in said tubular portion,
  said tubular portion having a greater internal lateral dimension than the external lateral dimension of said nut, and outwardly projecting tab means on said nut, said tubular portion having aperture means therethrough radially inwardly said second portion of said flange, and axially between said first portion of said flange and said radial edge, said tab means extending through said aperture means and being received in said recess adjacent said first and second portions of said flange, whereby said nut is permitted lateral floating movement while said tab means preclude substantial rotation of said nut.

2. A device as recited in claim 1 in which the opposite end of said tubular portion is bendable outwardly for forming a second flange for cooperating with said first-mentioned flange in holding said member to a workpiece.

3. A device as recited in claim 2 in which said tubular portion at said opposite end is of reduced wall thickness for facilitating the outward bending of said second flange.

4. A device as recited in claim 2 in which said tab means extend radially with respect to said nut at one end thereof.

5. A device as recited in claim 4 in which said nut is received entirely within said member.

6. A device as recited in claim 3 in which said flange and said substantially radial edge thereof are annular.

7. A device as recited in claim 6 in which said aperture means includes a pair of diametrically opposed circumferential slots in said tubular portion, said slots being radially opposite said second portion of said flange, and said tab means include a pair of tabs, said tabs extending radially from said nut in opposite directions at one end of said nut, said tabs being received in said slots, said tabs being narrower than said slots, the dimension between the outer ends of said tabs being less than the internal diameter of said second portion of said flange.

8. A device as recited in claim 7 including in addition a bolt for engagement with said nut, said bolt having a threaded shank terminating in a substantially conical end for facilitating entry of said shank into said nut.

9. A device as recited in claim 8 in which said bolt includes a relatively wide thin head.

10. A device as recited in claim 9 in which said nut includes a central protrusion extending outwardly from the outer surface of said head for use in aligning a driving tool on said head.

11. In combination with a workpiece having an opening therethrough, a first surface at one end of said opening and a second surface at the opposite end of said opening, a nut device comprising a member having a tubular portion extending through said opening, a first flange at one end of said tubular member extending outwardly and overlapping said first surface, a second flange at the opposite end of said tubular portion, said second flange having a first portion extending generally radially outwardly from said tubular portion, said first portion being spaced outwardly from said second surface, and a second portion extending from the outer edge of said first portion generally longitudinally toward said one end of said tubular portion, said second portion terminating in a substantially radial edge engaging said second surface for cooperating with said first flange in holding said member to said workpiece, said first and second portions defining a recess, and a nut received in said tubular portion, said nut including outwardly projecting tab means, said tubular portion having aperture means therethrough located axially between said first portion of said flange and said substantially radial edge, said tab means extending through said aperture means into said recess for retaining said nut to said member and preventing substantial rotation of said nut relative to said member, said tubular portion having a greater internal lateral dimension than the external lateral dimension of the body of said nut, said second portion of said second flange having a greater internal lateral dimension than the lateral dimension of said tab means, whereby said nut is permitted lateral floating movement relative to said sleeve.

12. A device as recited in claim 11 in which said tab means includes a pair of diametrically oppositely extending flat tabs, and said aperture means includes a pair of diametrically opposed slots larger than said tabs so as to provide a clearance around said tabs.

* * * * *